UNITED STATES PATENT OFFICE.

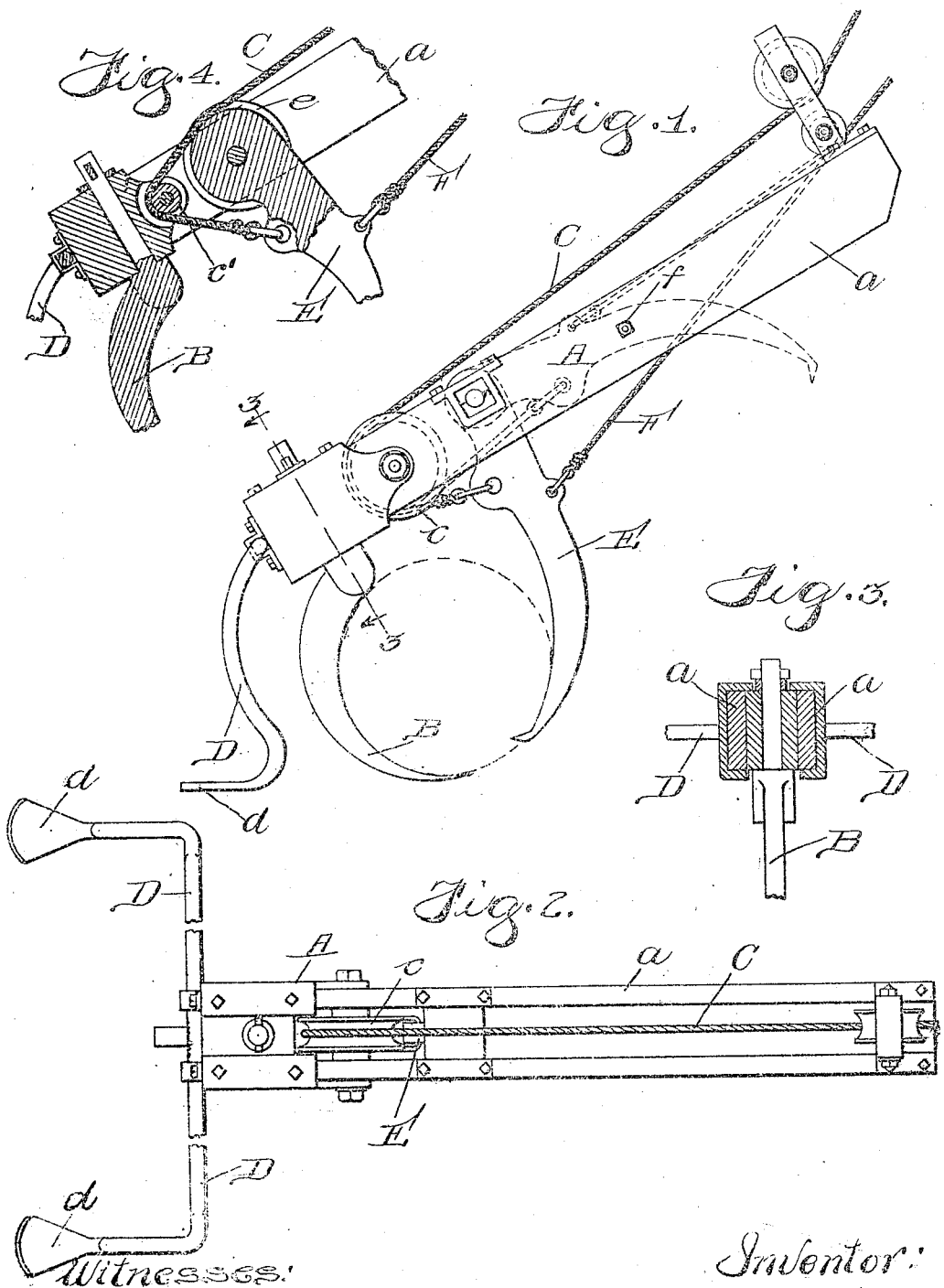

JAMES M. MUNN, OF EVANSTON, ILLINOIS, ASSIGNOR OF ONE-HALF TO ALEXANDER A. NORTON, OF CHICAGO, ILLINOIS.

LOG FINDER AND LIFTER FOR SUBMERGED LOGS, &c.

No. 873,579.  Specification of Letters Patent.  Patented Dec. 10, 1907.

Application filed April 2, 1906. Serial No. 309,314.

*To all whom it may concern:*

Be it known that I, JAMES M. MUNN, a citizen of the United States, residing at Evanston, in the county of Cook and State of Illinois, have invented a new and useful Log Finder and Lifter for Submerged Logs and other Bodies.

My invention relates especially to lumbering and a particular purpose of my device is the finding and lifting of submerged logs.

It is well known that in lumber districts a large amount of lumber lies submerged and often hidden at the bottom of lakes and rivers and that this lumber is yet sound and would be available for use if the logs comprising it could be located and brought to the surface of the water under which they are concealed. To secure these results, both of locating these logs and bodies, and lifting them when found, I have devised and invented the log finder and lifter for submerged timber illustrated in the accompanying drawings, in which Figure 1 is an elevation of the device. Fig. 2 is a plan. Fig. 3 is a section on the line 3—3 of Fig. 1. Fig. 4 is a modification.

Similar letters refer to similar parts throughout the several views.

In the drawings A represents the frame of my device and "*a*" the beam, preferably of wood for purposes hereafter described.

B is a searching tooth preferably in the form of a hook with the point advanced in the line of progress.

C is a cable, one end of which is led to the boat, windlass or other source of power, (not shown) and the other end is made fast to the finding device, and on the application of power the finding device is trailed through the water.

D, D, are legs, one on either side of the searching tooth B, and *d*, *d*, are feet at the extremity of the legs, broadened to prevent the legs from sinking into the mud or soft surface of the bottom of the lake or other water. These legs are designed to hold the searching tooth at the desired position with reference to the lake bottom and to hold the entire machine in equilibrium, and in this, the holding of the machine in equilibrium, the feet are further assisted by making the stem *a* of the frame "A" preferably of wood, which being lighter than the metal portions will, when submerged, act as a fishing cork and keep the hook and tooth in position. If for any reason wood is not used in the frame or becomes sodden and heavy, the same result may be secured by using an attached float of any buoyant material. My device is also provided with an upper jaw or second tooth E, preferably sharpened as shown in the drawings and adapted to coöperate with the searching tooth as hereinafter shown.

The tooth E is preferably hidden or held out of the way when not in use to prevent entanglement during the process of searching for the submerged timber; but the cable C, after being run through the head of the frame A over a pulley *c* therein as shown in Fig. 1; or, as shown in the modification illustrated in Fig. 4, over the pulleys *e* and *c'* therein, is also attached to the base of the secondary tooth E as shown in the drawings in a way to cause both teeth to operate from the same cable, for the searching tooth operates by being drawn over the surface of the lake bottom at the tension necessary for that purpose; but when it strikes the submerged log a greater resistance occurs and a greater tension is placed on the cable until the second tooth, which has a lever adjustment, is dislodged. A normal tension on cable C does not dislodge E, but an increase of tension on the main cable C beyond the normal tension, draws the tooth E downward to coöperate with the tooth B and clasps the log. The tension is then continued and increased until the log is brought to the surface and reclaimed. The auxiliary tooth E may be held more securely in position by a set screw or thumb screw *f* which regulates the tension.

In practice the device operates as follows: The machine is placed in the water of the lake or body of water to be searched for lumber. It sinks by the gravity of its metal portions until the feet of the machine rest on the bottom. The wooden parts of the machine have a tendency to float and cause the beam to stand at an angle of approximately forty-five degrees bringing the searching tooth in proper position to engage the log. The cable C is now drawn upon by boat, windlass or other power and the device, with the tooth B advanced before the feet, is dragged on the submerged surface. The tooth B being in advance of the feet will first engage with objects on the bottom of the water, and when a log is struck the sharp point of B sinks into and attaches the finder to the log. A further strain now dislodges the second tooth E and it in turn strikes its sharp point into the log on the opposite side thus completing the grasp of the finding machine on the submerged timber. These teeth are intended to have a cant-hook-like clamp upon the log and, working together, make it impossible for a log once grasped to escape from the clutch of the machine. When once attached, the log may be brought to the surface by power exerted on the cable in any of the usual ways. A second cable F is attached to the tooth or jaw E for the purpose of liberating the tooth. When it is desired to release the machine the cable C is slackened and then tension on the cable F will open the jaws of the machine and release the object grasped. The cable is shown in the drawings as working over pulleys and these are desirable and add to the utility of the device, but they are not essential and the device would operate without them.

The device may be constructed of any suitable material and in any way to secure these results, and the device will operate also without the buoyant feature, but not so well as with it. Other points than those described may be employed on the teeth, if securing the same results. The tooth B is movable laterally in the beam to allow of greater adjustability and is readily detachable to allow of being replaced when broken.

What I claim and desire to secure by Letters Patent of the United States is:

1. A log-finder for submerged logs comprising a lower tooth adapted to engage with objects in the line of its progress, and an upper tooth automatically coöperating with the lower tooth, substantially as described and shown.

2. A log-finder, comprising a frame, a lower searching tooth attached to the frame and located in advance of the legs and adapted to engage with objects in the line of its progress, and two legs located, one on either side of the searching tooth, to maintain the machine in position, substantially as described and shown.

3. A log-finder, comprising a frame, a searching-tooth located to take against and seize objects in its progress, an auxiliary tooth, automatically operated to assist the searching tooth in its grasp of an object, and means to maintain the equilibrium of the device, substantially as described and shown.

JAMES M. MUNN.

Witnesses:
F. JACOBSON,
D. A. HOLMES.